3,247,191
4β,19-OXIDO-STEROIDS
Albert Wettstein, Riehen, Georg Anner, Karl Heusler, and Jaroslav Kalvoda, Basel, and Charles Meystre, Reinach, Basel-Land, Switzerland, assignors to Ciba Corporation, New York, N.Y., a corporation of Delaware
No Drawing. Filed Sept. 12, 1962, Ser. No. 223,258
Claims priority, application Switzerland, Sept. 22, 1961, 11,072/61; May 25, 1962, 6,358/62; Aug. 13, 1962, 9,682/62; Aug. 28, 1962, 10,172/62
22 Claims. (Cl. 260—239.55)

The present invention relates to and has for its object the provision of new 4β,19-oxido-steroids.

Said oxido-steroids can be used, for example, for the preparation of important 19-nor-steroids (anabolic and progestative agents), such as derivatives of 19-nor-testosterone and 19-nor progesterone and the 3-desoxo derivatives thereof, e.g. Δ⁴-17β-hydroxy-17α-ethinyl-19-nor androstene.

The process according to the present invention consists in reacting 19-unsubstituted 4β-hydroxy-steroids with a compound generating monovalent positive iodine and, if desired, hydrolyzing and/or oxidizing the obtained 4β,19-oxido-steroids.

The reaction occurring in the above said process may be represented, for example, by the following scheme of partial formulae

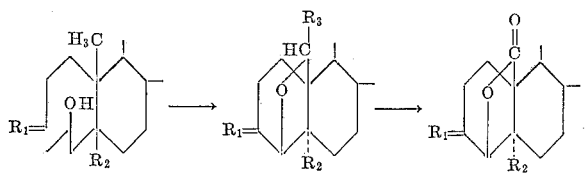

in which formulae $R_1$ represents two hydrogen atoms, a hydrogen atom together with an etherified or esterified hydroxyl group, or a ketalized oxo group, $R_2$ stands for a hydrogen or halogen atom or an etherified or esterified hydroxyl group, $R_1$ and $R_2$ taken together may also represent the radical of a dibasic acid or of a lower aliphatic or araliphatic diol and $R_3$ is a hydrogen or a iodine atom or a free or esterified hydroxyl group.

The starting materials for the present process are 4β-hydroxy compounds of the androstane, pregnane, cholane, cholestane, stigmastane, spirostane and cardanolide series, which may contain in the ring system, especially in one or more of the positions 1, 2, 3, 5, 6, 7, 8, 9, 11, 12, 14, 15, 16, 17, 20 and 21 further substituents, such as free or functionally converted oxo groups, esterified or etherified hydroxyl group, lower alkyl or alkenyl groups, e.g. methyl, ethyl, vinyl, or allyl groups, and/or halogen atoms. Functionally converted oxo groups are ketalized oxo groups or oxo groups converted into enol derivatives, e.g. enol ethers or enol esters. Furthermore the starting materials may contain double bonds or oxido groups for example in positions 9,11 and/or 16,17.

Valuable starting materials are, for example, such 4β-hydroxy steroids which contain in position 3 and, if desired, also in position 5, the substituents $R_1$ and $R_2$ as indicated above; such substituents are suitable for the formation of the Δ⁴-3-oxo-grouping after opening of the 4β,19-oxido bridge. There are particularly to be mentioned derivatives of 3α,4β,5α-trihydroxy-steroids, such as cyclic carbonates, sulfites, acetonides or benzal compounds, or especially 3-esters and 3-ethers of 3,4β-di-hydroxy-5α-halogensteroids or ketals of 3-oxo-4β-hydroxy-5α-halogen-steroids.

Specific starting materials are for example the following compounds: 3β,17β-diacetoxy-4β-hydroxy-androstane, 3β,17β-diacetoxy-4β-hydroxy-17α-methyl-androstane, the 3,5-carbonate of the 3α,4β,5α-trihydroxy-17-oxo-androstane, 3β,17β-diacetoxy-4β-hydroxy, 5α-chloro-androstane, 3β,17β - diacetoxy - 4β - hydroxy - 5α - bromo - androstane, 3β,17β-diacetoxy-4β-hydroxy-5α-chloro-17α-methyl-androstane, 3β,17β-diacetoxy-4β-hydroxy-5α-bromo-17α-methyl-androstane, 3β,20β-diacetoxy-4β-hydroxy-5α-chloro - pregnane, 3β,20β-dipropionyloxy-4β-hydroxy-5α-bromo - pregnane, 3β-acetoxy-4β-hydroxy-5α-chloro-20-oxo-pregnane or 3β-acetoxy-4β-hydroxy-5α-chloro-spirostane.

Especially important starting materials for the manufacture of 3-unsubstituted 4β,19-oxido-steroids are, for example, the 3-unsubstituted 4β-hydroxy-steroids, such as 4β-hydroxy-androstane, which contain in 17-position an oxo group or an esterified or etherified hydroxyl group, e.g. 4β-hydroxy-5α-chloro-17-oxo-androstane, 4β-hydroxy-17-oxo-androstane; 17-esters of the 4β,17β-dihydroxy-5α-chloro-androstane and the 4β,17β-dihydroxy-androstane, such as the 17-acetate, 17-propionate or 17-benzoate, 17-esters of the 4β,17β-dihydroxy-17α-methyl-5α-chloro-androstane and 4β,17β-dihydroxy-17α-methyl-androstane. Said starting materials are known or, if new, can be prepared according to known methods. The 4β-hydroxy-5α-halogen-steroids can be prepared for example by adding on a hypohalogenous acid to the double bond of corresponding 4,5-unsaturated compounds. 4β-hydroxy-steroids can also easily be prepared by catalytic hydrogenation of the corresponding 4-ketones with a platinum catalyst in acidic solution, such as in glacial acetic acid, or by hydrolytic cleavage of 4,5-epoxides.

The compound generating monovalent positive iodine, used in the process of the invention, are for example N-iodo-carboxylic acid amides or -imides, such as N-iodo-acetamide or N-iodo-succinimide, or iodine bromide or iodine chloride; furthermore alkylhypoiodites which can be prepared, for example, by reaction of iodine and alcohols with heavy metal oxides, such as mercuric oxide, silver oxide or lead oxide. Especially good yields of 4β,19-oxido-steroids are obtained by using acylhypoiodites, which are preferably obtained by the action of iodine on heavy metal salts of lower aliphatic, cycloaliphatic, araliphatic or aromatic carboxylic acids, such as acetic, propionic, trifluoroacetic, hexahydrobenzoic, phenylacetic or benzoic acid. The heavy metals mentioned above are especially such of the first and second sub group of the periodic system, such as silver or mercury. A very suitable method consists in reacting the 4β-hydroxy-steroids with iodine and lead tetraacylates. It is especially advantageous to prepare the iodine reactant, especially the acylhypoiodites, in the above described manner in the reaction medium itself. The process can, for example, be carried out in the following manner: the starting material is dissolved or suspended in a solvent which is inert to the oxidative agent, such as hydrocarbons, then there is added e.g. lead tetraacetate, iodine and, if desired, or weak base, such as calcium carbonate, and the reaction mixture is heated with stirring under normal or superatmospheric pressure. The reaction can also be carried out in a completely analogous manner with silver acylates or mercuric acylates, such as acetates, and iodine, or the complexes resulting from the interactions of these reactants, or with N-iodo-carboxylic amides or -imides, preferably in the presence of iodine. Particularly suitable solvents are saturated cyclic hydrocarbons such as cyclohexane, methylcyclohexane or dimethylcyclohexane. Likewise suitable are aromatic hydrocarbons, such as benzene, or halogenated hydrocarbons, such as carbon tetrachloride, hexachlorobutadiene or the like, or mixtures of said solvent. The requisite time of reaction depends on the temperature and/or the solvent used. When the reaction is performed with lead tetraacetate in boiling cyclohexane it is as a rule complete after ½ to 3 hours. Non-polar solvents favour the homolytic decomposition of the 4-hypoiodites which may have been formed during the reaction according to the present process, as compared to the heterolytic decomposition which would lead to 4-ketones. When a hypoiodous acid derivative is used, especially an acyl-hypoiodite, it is of advantage to use an excess thereof, because these substances likewise undergo homolytic decomposition to carbon dioxide and alkyliodide.

From the acetyl hypoiodite arizing from the reaction of lead tetraacetate with iodine, for example, methyl iodide and carbon dioxide form easily.

It is of advantage to perform the present reaction at an elevated temperature ranging for example from 50 to 150° C. The reaction can be accelerated by irradiating the reaction solution with visible and/or ultra-violet light. In many cases it is of further advantage to add to the irradiated reaction solution an excess of free iodine.

The 4β,19-oxido-steroids obtained according to the process of the invention contain in the rule in the 19-position a substituent. If lead tetraacylates and iodine are both used in excess, there are first formed 19-iodo-4β, 19-oxido-steroids which are then partially converted into 19-hydroxy- and 19-acyloxy-4β,19-oxido-steroids. When a very short reaction time is chosen, that is to say when the reaction occurring in the process of this invention is interrupted before all of the starting material has disappeared, the reaction mixture contains also 4β-hydroxy-19-iodo-steroids, which easily are converted into 19-unsubstituted 4β,19-oxido-steroids, for example by treatment with bases. If sliver or mercuric acylates and iodine or, for example, N-iodo-succinimide and iodine are used, mixtures of 19-unsubstituted 4β,19-oxido-steroids and 19-hydroxy- and 19-acyloxy-4β,19-oxido-steroids are obtained.

In the optical oxidation step, for example in aqueous solvents, such as acetone and aqueous chromic acid-sulfuric acid mixture, the 19-iodo-, 19-hydroxy- and 19-acyloxy-4β,19-oxido-steroids can be converted easily into 4β,19-lactones of 4β-hydroxy-steroid-19-acids.

If desired, the oxygenated C-19-methyl-group of 19-unsubstituted 4β,19-oxides can be further oxidized under more drastic conditions, which can be effected, for example, by using strong oxidation agents, such as ruthenium tetroxide or especially derivatives of hexavalent chromium, e.g. chromic acid or tertiary butyl chromate, in solvents, such as lower fatty acids, e.g. acetic or propionic acid or chlorinated hydrocarbons, e.g. carbon tetrachloride, especially at an elevated temperature, such as between 50 and 100°. There are obtained 4β,19-lactones of 4β-hydroxy-steroid-19-acids. The latter may be reduced, for example according to the process of U.S. patent application Serial No. 180,029, filed March 15, 1962, by Albert Wettstein et al., now U.S. Patent No. 3,165,511, with dialkyl-aluminiumhydrides, such as diisobutyl aluminum-hydride at low temperature. The reduction products are 4β,19-oxido-19-hydroxy-compounds which are the cyclohemiacetals of 4β-hydroxy-19-oxo-steroids.

On the other hand, an acyloxy group present in a 4β,19-oxide obtained by the present process, for example in position 3 and 17 or 20, can be hydrolyzed and the resulting hydroxy compound oxidized to a 3-ketone, 3,17-diketone or 3,20-diketone.

The 4β,19-oxido steroids obtained according to the present invention can be transformed into pharmacologically active compounds, for example, as follows: a 5α-halogeno-4β,19-oxido-17-oxo-androstane can be reacted with an alkyl-metal, alkenyl-metal or alkinyl-metal compound, for example with methyl magnesium iodide, methyl lithium, ethyl magnesium iodide, isobutyl lithium, allyl magnesium bromide, methallyl magnesium bromide, sodium acetylide, potassium acetylide or lithium acetylide, propargyl magnesium bromide, lithium methylacetylide or the like, whereby without the 5α-halogeno group being attacked—the corresponding 17β-hydroxy-17α-alkyl-, -alkenyl- or -alkinyl-androstanes are obtained.

It is further possible to introduce a 17α-hydroxy and/or 21-hydroxy group in known manner into a resulting 4β,19-oxido-20-oxo-pregnane, more especially, for example, by enol acetylation to form the $\Delta^{17(20)}$-20-acetate followed by oxidation with peracetic acid and hydrolysis to the 17α-hydroxy-20-ketone.

4β,19-oxides containing no halogen in position 5α are easy to open hydrolytically or acylolytically. It is of special advantage to perform the opening with an acylating agent in the presence of an acid catalyst, using for example a carboxylic acid anhydride, such as acetic or propionic anhydride, or a mixed anhydride of a carboxylic acid with formic or trifluoroacetic acid. Suitable acid catalysts are compounds of the type of the known Lewis acids, for example boron trifluoride, zinc chloride, ferric chloride or the like, the use of which gives rise to 4β,19-diacyloxy compounds. Other acid catalysts such as para-toluenesulfonic acid, sulfuric or perchloric acid and an acid anhydride, on the other hand, give rise to $\Delta^4$-19-acyloxy-steroids. The 4β,19-oxides can also be converted into 4α-halogeno-19-acyloxy-steroids with acid halides, for example acetyl chloride or acetyl bromide, if desired with addition of hydrochloric or hydrobromic acid; in these latter compounds it is easy to eliminate the 4-halogen atom with formation of a 4,5-double bond in known manner, more especially after having formed a 3-oxo group by hydrolyzing a 3-acyloxy group followed by oxidation. 3-unsubstituted $\Delta^4$-19 - hydroxy-steroids can easily be converted into $\Delta^4$-3-oxo-19-hydroxy-steroids by the action of chromium-trioxide in glacial acetic acid or acetone and sulfuric acid.

The conversion of the resulting 19-oxygenated $\Delta^4$-3-ketones into 19-norsteroids is known.

The 5α-halogeno-4β,19-oxides are difficult to open with hydrolytic means. On the other hand, it is surprisingly easy to open the 4β,19-oxygen bridge under reducing conditions, more especially with reducing agents that are suitable for reducing halohydrins to olefines. Particularly suitable are metallic reducing agents, for example alkali or alkaline earth metals, such as sodium, potassium, lithium or more especially calcium, advantageously dissolved in liquid ammonia or in an amine, such as ethylamine, isopropylamine, ethylenediamine or the like, if desired with addition of a diluent, such as ether, tetrahydrofuran or dioxane.

Of special industrial value is the reduction with zinc, using as solvent an alcohol or advantageously a lower aliphatic carboxylic acid, such as acetic acid, propionic acid or the like, if desired with addition of a diluent, such as benzene, dioxane or the like.

The opening under reducing conditions is particularly easy to perform in the case of 5α-bromo-4β,19-oxides and of the 3-oxo-4β,19-oxido-5α-halogeno-steroids obtainable from 3β-acyloxy-4β,19-oxides by hydrolysis and oxidation. Whenever the opening of 4β,19-oxides is performed under reducing conditions, $\Delta^4$-19-hydroxy-steroids are obtained.

The 4β,19-oxido-19-hydroxy-steroids obtained by the present process, which may also be prepared from the corresponding 19-acetates by mild alkaline or acid hydrolysis, are very easy to oxidize to form 4β,9-lactones of 4β-hydroxy-steroid-19-acids. For this purpose an oxidizing agent is used, such as manganese dioxide or chromium trioxide, preferably in pyridine, or alternatively potassium permanganate. These lactones are identical with those obtained by the energetic oxidation of the 4β,19-oxides described above.

The 4β,19-oxido-5α-halogen-19-hydroxy-steroids and the 4β,19-lactones of 4β-hydroxy-5α-halogen-steroid-19-acids are very easy to open under reducing conditions with the substances mentioned above, more especially with zinc and a lower fatty acid, for example acetic acid. After the reduction a very good yield of Δ⁴-19-oxo-steroids or Δ⁴-steroid-19-acids respectively is obtained. The latter acids can either be esterified in known manner or decarboxylated by heating, more especially in the presence of quinoline and copper powder, to Δ⁵⁽¹⁰⁾-19-nor-steroids.

The obtained 4β,19-oxido-19-hydroxy-steroids which are unsubstituted in the position 3 and 5 and which also can be obtained as mentioned above by reduction of the corresponding lactones, can be converted by the action of hydroxylamine into 4β-hydroxy-19 - oximino-steroids. The latter can be dehydrated, for example with thionyl chloride or phosphorus oxychloride, to yield Δ⁴-10β-cyano-19-nor-steroids, which are convertible, for example by the action of sodium in alcohol, into the biologically active difficulty accessible 3-unsubstituted Δ⁵⁽¹⁰⁾-19-norsteroids.

For the conversion of the Δ⁴-3-oxo-19-hydroxy-steroids obtained by the present process into 19-norsteroids they are treated, for example, in known manner with a strong alkali such as an alkali metal hydroxide or alcoholate. It is, however, of advantage to oxidize the 19-hydroxyl group to a 19-oxo or 19-acid group before proceeding to the elimination of the angular 19-carbon atom, for example with chromic acid-pyridine complex or with chromium trioxide in glacial acetic acid or in acetone sulfuric acid. The Δ⁴-3,19-dioxo compounds give off formic acid even on mild treatment with alkali and the decarboxylation of the Δ⁴-3-oxo-19-acids is even easier to perform. As is known, the decarboxylation by heating in pyridine yields predominantly Δ⁵⁽¹⁰⁾-3-oxo-19-nor-compounds which are then converted in known manner, for example by treatment with an acid, into Δ⁴-3-oxo-19-norsteroids.

Alternatively, the 19-carbon atom can be eliminated by heating the Δ⁴-3-oxo-19-hydroxy compounds with a ketone and an aluminum alcoholate or a magnesium alcoholate, for example with cyclohexanone, a quinone, benzophenone and aluminum isopropylate, tertiary butylate or phenolate in a suitable solvent, such as benzene or toluene.

An object of the present invention are also 4β,19-oxido-steroids which may contain in the 19-position a further oxygen substituent, such as a hydroxy or acyloxy group, and belong to the androstane, pregnane, cholane, cholestane, stigmastane, spirostane and cardanolide series. They may contain preferably in position 3 and/or 5 such substituents which enable the formation of a Δ⁴-3-oxo-grouping, especially 4β,19-oxido-3,5-dihydroxy-steroids and 4β,19-oxido-3-hydroxy-5-halogen-steroids, their ethers and esters and the compounds containing in 19-position hydroxyl or acyl groups. Furthermore 4β,19-lactones of 4β-hydroxy-steroid-19-acids containing in position 3 and if desired 5, substituents that enable a Δ⁴-3-oxo-grouping to be formed, for example 4β,19-lactones of 3,5-dihydroxy-steroids and their derivatives or of 3-hydroxy-5α-halogeno-steroids and their ethers and esters.

The invention provides more especially saturated and unsaturated 4β,19-oxido compounds of the androstane and pregnane series such, for example, as 3-hydroxy-5α-halogen- or -hydroxy-4β,19-oxido-androstanes and their esters, such as 3β,17β-dihydroxy-5α-chloro- or -bromo-4β,19-oxido-androstane, 3β-hydroxy-5α-chloro- or -bromo-4β,19 - oxido - 17-oxo-androstane, 4β,19-dihydroxy-5α-chloro- or -bromo-4β,19-oxido-17α-, alkyl such as -methyl- or -ethyl-androstane, 3β,17β - dihydroxy - 5α-chloro- or -bromo-4β,19-oxido-17α-alkenyl-androstanes, 3β,17β-dihydroxy-5α-chloro- or -bromo-4β,19-oxido-17α-ethinyl-androstane and the esters of these compounds, such as the 3,5-carbonate of the 3α,5α-dihydroxy-4β,19-oxido-17-oxo-androstane. There are also to be mentioned the compounds which correspond to those mentioned above and have a 3-oxo group instead of the 3-hydroxy groups and their esters and also the 3-unsubstituted 4β,19-oxido-androstanes, such as 4β,19-oxido-17β-hydroxy-androstane, 4β,19-oxido-17β-hydroxy-17α-methyl-androstane or 4β,19-oxido - 17 - oxo-androstane, 4β,19-oxido-5α-halogen-androstanes, such as 4β,19-oxido-5α-chloro- or -bromo-17-oxo-androstane, 4β,19-oxido-5α-chloro- or -bromo-17β-hydroxy-androstane and the esters thereof. The present invention also comprises 3-hydroxy-5α-halogen- or -hydroxy-4β,19-oxido-pregnanes and their esters, for example such as contain in 20-position a free or esterified hydroxyl group or a free or ketalized oxo group, especially 3β,20-dihydroxy-5α-chloro- or -bromo-4β,19-oxido-pregnane, 3β-hydroxy-5α-chloro- or -bromo-4β,19-oxido-20-oxo-pregnane, 3β-hydroxy-5α-chloro- or -bromo-4β,19;16,17α - bis-oxido - 20-oxo-pregnane, 3β,17α-dihydroxy-5α-chloro- or -bromo-4β,19-oxido-20-oxo-pregnane and the esters thereof such, for example, as the 3,5-carbonate of the 3α,5α-dihydroxy-4β,19-oxido-20-oxo-pregnane or the esters thereof; the corresponding 3-oxo-5α-halogeno-compounds and the 4β,19-oxido-pregnanes unsubstituted in position 3 or 3 and 5, and the esters of these compounds.

Another object of the present invention are 4β,19-oxido-19-hydroxy-steroids and the esters thereof (that is to say the hemiacetals of 4β-hydroxy-19-oxo-steroids) and 4β,19-lactones of the 4β-hydroxy-steroid-19-acids, especially those of the androstane and pregnane series, preferably such compounds as contain in the 5α-position a halogen atom and if desired in 3-position a free, esterified or etherified hydroxyl group or a free or ketalized oxo group. Specific compounds are: 3β,17β,19-trihydroxy-4β,19-oxido-5α-halogen-androstanes, 3β,19-dihydroxy-4β,19-oxido-5α-halogen-17-oxo-androstanes, 4β,19-oxido-5α-halogen-17β,19-dihydroxy-androstanes or 4β,19-oxido-17β,19-dihydroxy-androstane and the esters thereof. Furthermore the 4β,19-lactones of 3β,4β,17β-trihydroxy-5α-chloro - androstane - 19-acid, 3β,4β-dihydroxy-17-oxo-androstane-19-acid, 4β,17β-dihydroxy-androstane - 19 - acid or 4β,17β-dihydroxy-5α-chloro-androstane-19-acid and their esters.

Especially valuable final products obtainable according to the process of the present invention are compounds of the Formulae I and II (I)

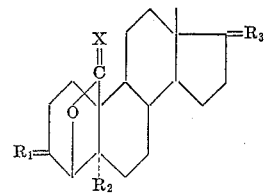

and (II)

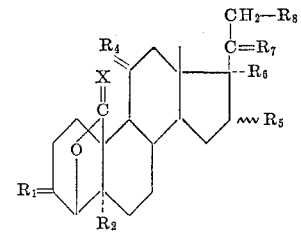

in which $R_1$ represents two hydrogen atoms, a hydrogen atom together with a free, esterified or etherified hydroxyl group, an oxo group or a lower alkylenedioxy group, $R_2$ stands for a hydrogen or halogen atom or a free, esterified or etherified hydroxyl group, $R_1$ and $R_2$ when taken together may also represent the radical of a dibasic acid or a lower aliphatic or araliphatic diol, $R_3$ is an oxo group, a lower alkylenedioxy group, or a hydrogen atom or a lower aliphatic hydrocarbon radical, such as an alkyl, alkenyl or alkinyl group, together with a β-positioned free esterified or etherified hydroxyl group, X and $R_4$ are two hydrogen atoms, a hydrogen atom and a free or esterified hydroxyl group, or an oxo group, $R_5$ is a hydrogen atom, a methyl group or a free esterified or etherified hydroxyl group, $R_1$ and $R_6$ when taken together may also represent the radical of a lower aliphatic or araliphatic diol, $R_6$ and $R_8$ are a hydrogen atom or a free or esterified hydroxyl group and $R_7$ represents a hydrogen atom together with a free or esterified hydroxyl group, an oxo group or a lower alkylene-dioxy group.

Another object of the present invention are the new compounds used as starting materials in the present process, that is to say the 4β-hydroxy-5α-androstanes and their precursors, namely the corresponding 4-oxo-compounds, such, for example, as 4-oxo-17β-hydroxy-5α-androstane, 4,17-dioxo-5α-androstane or 4β,17β-dihydroxy-5α-androstane the corresponding compounds which contain in position 17α a saturated or unsaturated hydrocarbon radical, such as a lower alkyl, alkenyl or alkinyl group, and the esters thereof. The latter compounds are, for example, 4-oxo-17α-methyl, -ethyl, -vinyl, -allyl or -ethinyl-17β-hydroxy-5α-androstane or 4β,17β-dihydroxy-17α-methyl, -ethyl, -vinyl, -allyl or -ethinyl-5α-androstane and their esters.

These compounds surprisingly exhibit a very valuable quotient of anabolic and androgenic action and can, therefore, be used in therapy as anabolic agents. They can be prepared according to known methods, for example, starting from 3-unsubstituted Δ⁴-androstenes by nitration and reduction of the resulting Δ⁴-4-nitro-androstenes, for example with zinc in glacial acetic acid, or by epoxidation of the Δ⁴-double bond and isomerization of the resulting epoxide into the 4-ketone with acidic catalysts, such as mineral acids, e.g. sulfuric or perchloric acid, aromatic sulfonic acids, e.g. p-toluene- or p-nitrobenzenesulfonic acid, or Lewis acids, e.g. boron trifluoride, tin-tetra-chloride or aluminum chloride. Preferred starting materials are Δ⁴-3-oxo-androstenes, which can be converted into the 4-oxo-compounds, for example, by epoxidation and hydrolysis to form Δ⁴-3-oxo-4-hydroxy-androstenes. The latter are reacted with dithioglycols, such as ethylene dithioglycol, and the 3-thioketals obtained are converted into the 3,4-dioxo-compounds by desulfuration, for example with Raney-nickel. If desired, the reaction products can be epimerized in position 5 by the action of bases or acids.

In the above mentioned esters the acyl radicals are especially such of aliphatic, cycloaliphatic, araliphatic and aromatic carboxylic acids with 1–15 carbon atoms, such as formic, methyl- or ethylcarbonic, acetic, trifluoroacetic, propionic, butyric, trimethylacetic, valeric, caproic, enanthic, decanoic, hexahydro-benzoic, cyclopentylpropionic, phenylpropionic or furanecarboxylic acid.

Etherified hydroxyl groups are for instance lower alkyloxy groups or the tetrahydro-pyranyloxy group.

The present invention also includes any variant of the present process in which only some of the process steps are carried out, if desired in a different order of succession, or in which an intermediate obtained at any stage of the process is used as starting material and any remaining steps are carried out.

The following examples illustrate the invention.

*Example 1*

A hot suspension of 6.50 grams of lead tetra-acetate and 3.0 grams of calcium carbonate in 300 cc. of cyclohexane is treated with 1.50 grams of 3β, 17β-diacetoxy-4β-hydroxy-5α-chloro-androstane and 1.95 grams of iodine and the mixture is refluxed for one hour while being stirred and irradiated with a 500 watt lamp, whereupon the color of iodine disapperas substantially completely. The reaction mixture is then allowed to cool and filtered and the filtrate is washed with sodium thiosulfate solution and with water, dried with magnesium sulfate and evaporated, to yield 2.856 grams of a partially crystalline crude product which contains a substantial amount of cyclohexanol acetate. After crystallization from pentane there are obtained 502 mg. of 3β,17β,19-triacetoxy-4β,19-oxido-5α-chloro-androstane which melts at 242 to 245° C. after having been crystallized from ether. Infra-red bands inter alia at 5.70, 5.78, 7.30, 8.17, 9.68, 9.98, 10.25, 10.50 and 11.45μ.

The mother liquor is evaporated to dryness and the residue chromatographed on 60 grams of alumina. 4:1- and 1:1-mixtures of hexane and benzene elute small amounts of by-products.

Finally, benzene elutes a further amount of the 3β,17β, 19-triacetoxy-4β,19-oxido-5α-chloro-androstane described above.

The 3β,17β-diacetoxy-4β-hydroxy-5α-chloro-androstane used as starting material is manufactured as follows:

3.73 grams of Δ⁴-3β,17β-dihydroxy-androstene are acetylated overnight at room temperature in 30 cc. of pyridine and 30 cc. of acetic anhydride. The reaction mixture is then evaporated to dryness under a water-jet vacuum and the residue crystallized from ether+pentane. Pure Δ⁴-3β,17β-diacetoxy-androstene melts at 110–112° C. Optical rotation $[\alpha]_D = +1.2°$ (in chloroform). Infra-red bands inter alia at 5.78, 7.29, 8.12, 9.62 and 9.82μ.

A solution of 3.0 grams of the above diacetate in 180 cc. of ether is treated with 180 cc. of water and 3.0 grams of chloride of lime, the mixture is thoroughly agitated and acidified by adding 2.1 cc. of glacial acetic acid, then thoroughly mixed for 50 minutes, separated, and the ethereal solution is washed with sodium thiosulfate solution and then with water, dried and evaporated. Crystallization of the residue (3.395 grams) from ether furnishes 1.1 grams of 3β,17β-diacetoxy-4β-hydroxy-5α-chloro-androstane which, after having been recrystallized from ether, melts at 153 to 156° C. Optical rotation $[\alpha]_D = +4.0°$ (in chloroform). Infra-red bands inter alia at 2.80, 5.74, 5.77, 7.30, 8.16, 9.52, 9.80 and 10.57μ.

*Example 2*

A mixture of 20 cc. of absolute cyclohexane, 600 mg. of pre-dried lead tetraacetate and 200 mg. of calcium carbonate dried over phosphorus pentoxide is heated within 15 minutes to 80° C. while being stirred. The cooled suspension is then treated with 100 mg. of iodine and 119 mg. of 4β-hydroxy-5α-chloro-17β-propionyloxy-androstane and while stirring the reaction mixture and irradiating it externally with a 500 watt lamp it is boiled until the violet coloration disappears (about 40 minutes). Inorganic products are filtered off the reaction mixture, the clear solution is diluted with ether and washed successively with a solution of 2.5 grams of sodium thiosulfate in 10 cc. of water and with 2 x 20 cc. of water, then dried with sodium sulfate and evaporated under vacuum. Crystallization of the resulting oily crude product (138 mg.) from petroleum ether yields 70 mg. of 5α-chloro-17β-propionyloxy-19-acetoxy-4β,19-oxido-androstane, which, after recrystallizaation from ether+petroleum ether, melts at 154 to 156° C. Its infra-red spectrum contains bands inter alia at 5.73, 5.80, 7.35, 8.15, 8.38, 9.68, 9.89, 10.00, 10.50 and 11.42μ. Optical rotation $[\alpha]_D = -38°$ (c.=0.875). Chromatography of the mother liquors on alumina (activity II) furnishes in addition to traces of the 4β,19-lactone of 4β-hydroxy-5α-chloro-17β-propionyloxy-androstane-19-acid, 21 mg. of 5α-chloro-17β-propionyloxy-19-hydroxy-4β,19-oxido- androstane melting at 126 to 128° C. Its infra-red spectrum contains bands inter alia at 2.85, 5.80, 8.36, 9.22, 9.34, 9.58, 9.95, 10.05 and 11.40μ.

The chlorohydrin used as starting material in the reaction described above is prepared in the following manner:

A solution of 3.0 grams of testosterone propionate in 90 cc. of absolute ether, mixed with 10 cc. of ethylene dithioglycol and 10 cc. of boron trifluoride etherate, is kept for 16 hours at 20° C. The reaction solution is then poured into a separating funnel containing ether and 400 cc. of ice-cold 2 N-sodium hydroxide solution, the ethereal layer is once more washed with ice-cold sodium hydroxide solution and water, dried and evaporated under vacuum, to yield 3.85 grams of a crystalline product which, after recrystallization from ether+petroleum ether, yields 3.3 grams of 3-ethylene thioketal of testosterone propionate, melting at 162 to 163° C. Optical rotation $[\alpha]_D^{25} = +118°$ (c.=1.05). From the mother liquor another 330 mg. of the identical product are obtained. The infra-red spectrum contains absorption bands inter alia at 5.80, 7.29, 8.38, 9.25, 9.56, 9.63 and 9.80µ.

A mixture of 2.30 grams of the thioketal, 120 cc. of dioxane and 20.0 grams of Raney nickel is refluxed for 3½ hours. The inorganic constituents are filtered off and the solution is evaporated under vacuum, to yield 1.85 grams of crude $\Delta^4$-17β-propionyloxy-androstene which is purified by chromatography on alumina. The compound melts at 60 to 62° C. Infra-red absorption bands inter alia at 5.81, 7.30, 7.50, 8.38 and 9.25µ.

A solution of 1.20 grams of $\Delta^4$-17β-propionyloxy-androstene in 60 cc. of ether, 70 cc. of water, mixed with 1.20 grams of chloride of lime and 0.85 cc. of glacial acetic acid, is vibrated for 15 minutes at 20° C. After dilution with ether the aqueous layer is separated and the ethereal solution is agitated with 15 cc. of a potassium iodide solution of 10% strength and sodium thiosulfate solution of 10% strength, washed with water until the washings run neutral, dried and evaporated. When the resulting crude product (1.40 grams) is sprinkled with petroleum ether and the crystalline phase is then recrystallized from ether+petroleum ether, pure 4β-hydroxy-5α-chloro-17β-propionyloxy-androstane melting at 157 to 158° C. with decomposition is obtained. Its infra-red spectrum contains bands inter alia at 2.83, 5.81, 7.50, 8.38, 9.27, 9.98, 10.50, 10.68 and 11.55µ.

*Example 3*

A solution of 8.5 mg. of 5α-chloro-17β-propionyloxy-19-acetoxy-4β,19-oxido-androstane in 2.5 cc. of glacial acetic acid, mixed with 600 mg. of zinc powder, is heated with stirring for 30 minutes at 100° C. Ether is added and the zinc salts formed and excess zinc are filtered off and the filtrate is evaporated under vacuum. The residue is taken up in petroleum ether, again filtered and chromatographed on 200 mg. of alumina. Benzene elutes 4.5 mg. of $\Delta^4$-17β-propionyloxy-19-oxo-androstene. Its infra-red spectrum contains bands inter alia at 3.74, 5.82, 7.50, 8.38, 9.25 and 11.40µ.

The identical compound is also obtained by treating 5α-chloro-17β-propionyloxy-19-hydroxy-4β,19-oxido-androstane in a similar manner.

*Example 4*

A solution of 20 mg. of 5α-chloro-17β-propionyloxy-19-hydroxy-4β,19-oxido-androstane in 2 cc. of actone is treated with 0.18 cc. of a solution of chromium trioxide in aqueous sulfuric acid and the whole is stirred for 30 minutes at 0° C. Usual working up furnishes 17 mg. of the 4,19-lactone of 4β-hydroxy-5α-chloro-17β-propionyloxy-androstane-19-acid. Its infra-red spectrum contains bands inter alia at 5.66, 5.80, 7.32, 8.38, 9.35 and 11.32µ.

*Example 5*

100 mg. iodine and 100 mg. 4β-hydroxy-17β-propionyloxy-5α-androstane are added to a suspension of 600 mg. of dry lead (IV) acetate and 200 mg. of calcium carbonate in 40 ml. of cyclohexane which has been heated for a short period to 80°. The reaction mixture is refluxed while stirring and irradiating with a 500 watt lamp for 15 minutes. After cooling the colorless solution is filtered, the inorganic filter residue is washed with 50 ml. of cyclohexane and the combined filtrates are evaporated in a vacuum at a temperature of 45° after washing it with 10 ml. of a 10% sodium thiosulfate solution and 30 ml. of water. The residue (115 mg.) is dissolved in 5 ml. of acetone, to the solution there are added 150 mg. of silver chromate and the whole is kept during 13 hours at 20°. To the cooled reaction mixture (0–4°) there are added dropwise 0.2 ml. of an 8 N-solution of chromium trioxide in sulfuric acid. After keeping the mixture 45 minutes at the same temperature it is diluted with 20 ml. of benzene and after addition of 1.8 g. of sodium acetate in 3 ml. of water it is worked up as usual. There are obtained 105 mg. of a crystalline crude product which is purified preferably by chromatography on aluminum oxide; using a pentane-benzene-(1:1)-mixture there is eluted the 4β,19-lactone of 4β-hydroxy-17β-propionyloxy-5α-androstane-19-acid which melts after recrystallization from methylene chloride-petroleum ether at 189–190°; $[\alpha]_D^{25} = -18°$ (c.=1.0).

The starting material used can be obtained from the $\Delta^4$-17β-propionyloxy-androstene described in Example 2 as follows: 5.0 grams of this compound are dissolved in 75 ml. of acetic acid and 30 ml. of concentrated nitric acid is added dropwise during 30 minutes while cooling (temperature below 20°). There are then added during one hour 3.0 grams of sodium nitrite in portions while stirring. The reaction mixture is poured out onto 1.2 liters of water, the whole is stirred for 10 minutes and the precipitated product filtered, washed with water and dried. There is obtained crude $\Delta^4$-4-nitro-17β-propionyloxy-androstene (melting point 145–155°) which is dissolved in 34 ml. of glacial acetic acid while warming gently. The solution is diluted with 5 ml. of water and there is added while stirring 10.0 grams of zinc powder in portions. During the addition of the zinc the temperature of the solution rises up to 90°, the mixture is then refluxed further for 4 hours, then cooled, filtered from superfluous zinc and the filtrate evaporated in vacuo. The residue is dissolved in ether-methylene chloride, the solution washed until neutral, dried and again evaporated in vacuo. The residue (4.2 grams) contain the crude 4-oxo-17β-propionyloxy-5α-androstane which is purified by chromatography and additional crystallization and melts at 121°. By catalytic hydrogenation in glacial acetic acid with platinum oxide as a catalyst the latter compound is reduced to the 4β-hydroxy-17β-propionyloxy-5α-androstane melting at 159–100°; $[\alpha]_D^{25} = +5°$ (c.=0.84).

The 4β,19-lactone of the 4β-hydroxy-17β-propionyloxy-5α-androstane-19-acid is reduced with lithium aluminum hydride in tetrahydrofuran to the 4β,17β,19-trihydroxy-androstane which can be transformed by the action of 10 parts propionic acid and 1 part of concentrated sulfuric acid within 16 hours at 20° to the 4β,19-oxido-17β-propionyloxy-5α-androstane melting at 112–114° and which is described in Example 6.

*Example 6*

1.0 gram of mercuric (II) acetate and 300 mg. of 4β-hydroxy-17β-propionyloxy-androstane are suspended in 50 ml. of cyclohexane and the mixture boiled for 2 hours with irradiation and stirring after the addition of 1.10 grams of iodine; red mercuric iodide precipitates. The insoluble constituents are then filtered off, the filter residue is washed with cyclohexane and the filtrate extracted with thiosulfate solution and with water. From the organic solution there are obtained after evaporation 359 mg. of crude product which is dissolved in 30 ml. of acetone. The solution cooled to 0° C., containing 4β,19-oxido-17β-propionyloxy-19-iodo-androstane in addition to 4β,19-oxido-17β-propionyloxy-androstane, is then treated with 200 mg. of silver chromate, stirred for 15 minutes and then oxidized for 15 minutes with 0.4 ml. of an 8 N-chromic acid solution in aqueous sulfuric acid. 4 ml. of isopropanol are then added, the reaction solution diluted with 100 ml. of methylene chloride, the insoluble constituents separated by filtration and the filtrate extracted several times with water. The dried methylene chloride solution is evaporated to yield 300 mg. of a crystalline residue which is recrystallized from a mixture of ether and pentane to give 92 mg. of the 4β,19-lactone of 4β-hydroxy-17β-propionyloxy-androstane-19-acid which on being recrystallized from ether melts at 189–190° C.; optical rotation $[\alpha]_D = -18°$ (in chloroform). Infrared bands inter alia at 5.64μ, 5.76μ, 8.40μ, 9.20μ, 9.45μ, 9.71μ, 10.20μ and 10.81μ.

The mother liquor is chromatographed on 10 grams of alumina. With 210 ml. of a mixture of benzene and hexane (1:9) 84 mg. of crude 4β,19-oxido-17β-propionyloxy-androstane are eluted which, after being recrystallized from methanol, melts at 112–114° C.; optical rotation $[\alpha]_D = +21°$ (in chloroform). Infrared bands inter alia at 5.77μ, 8.40μ, 9.32μ, 9.44μ, 9.52μ and 11.89μ. With a mixture of hexane and benzene (1:1) a further 40 mg. of the above described 4β,19-lactone are obtained. Finally, with benzene 27 mg. of the anhydro product (M.P. 272–274° C.) formed from two molecules each of 4β,19-oxido-17β-propionyloxy-19-hydroxy-androstane are obtained. Infrared bands inter alia at 5.77μ, 7.31μ, 7.39μ, 7.57μ, 8.39μ, 9.25μ, 9.73μ, 10.11μ and 10.62μ.

*Example 7*

A suspension of 1.0 gram of silver acetate and 300 mg. of 4β-hydroxy-17β-propionyloxy-androstane in 75 cc. of cyclohexane is boiled for 30 minutes with stirring and irradiation with a Philips combined mercury vapor and incandescent lamp after the addition of 765 mg. of iodine. 100 mg. of iodine are then added and the whole boiled for another 90 minutes. The reaction mixture is worked up as described in the preceding example and oxidized with silver chromate and chromic acid for 25 minutes. There are obtained 386 mg. of crude product which is purified by chromatography on 10 grams of alumina. From the first fractions eluted with 120 ml. of a mixture of hexane and benzene (9:1) there are obtained 144 grams of crude 4β,19-oxido-17β-propionyloxy-androstane which melts at 112–114° C. after recrystallization from methanol. From the following fractions eluted with mixtures of benzene and hexane (9:1) and (4:1) there are obtained 51 mg. of the 4β,19-lactone of 4β-hydroxy-17β-propionyloxy-androstane-19-acid melting at 189–190° C. The following fractions eluted with benzene contain 4-oxo-17β-propionyloxy-androstane (about 50 mg.).

*Example 8*

300 mg. of 4β-hydroxy-17β-propionyloxy-androstane are suspended in 75 ml. of cyclohexane and, after the addition of 750 mg. of N-iodosuccinimide, 500 mg. of calcium carbonate and 50 mg. of iodine, boiled with stirring and irradiation with a Philips combined mercury vapor and incandescent lamp. After one hour a further 750 mg. of iodosuccinimide are added and the whole boiled for another 2 hours. The reaction mixture is then worked up as described in the preceding example and oxidized with silver chromate and chromium trioxide. There are obtained 377 mg. of a crude product which is chromatographed on 10 grams of alumina. By crystallization from ether of the evaporation residue of the first fractions, eluted with a mixture of hexane and benzene (9:1), there are obtained 26 mg. of 4β,19-oxido-17β-propionyloxy-androstene melting at 112–114° C. From the following fractions eluted with the same mixture there are obtained 16.3 mg. of the 4β,19-lactone of 4β-hydroxy-17β-propionyloxy-androstane-19-acid. With a mixture of hexane and benzene (4:1) there finally obtained approximately 15 mg. of 4-oxo-17β-propionyloxy-androstane.

100 mg. of 4β,19-oxido-17β-propionyloxy-5α-androstane in 5 ml. of acetic anhydride are treated with 150 mg. of para-toluene-sulfonic acid for 15 hours at 20° C. The reaction mixture is then worked up (by adding 5 grams of crystalline sodium acetate, pouring the reaction mixture on to a mixture of ice and water, stirring the whole for 30 minutes, extracting with ether, washing the extracts neutral, drying and evaporating in vacuo) to yield 102 mg. of crude $\Delta^4$-19-acetoxy-17β-propionyloxy-androstene. The above compound is reduced in a tetrahydrofuran solution with excess lithium aluminum hydride, $\Delta^4$-17β,19-dihydroxy-androstene being isolated in practically quantitative yield. Without any further purification the so-obtained product is converted into the crude $\Delta^4$-17-oxo-androstene-19-acid by treating a solution thereof in 5 ml. of acetone at 5° C. with 0.6 ml. of 8 N-chromium (VI) oxide solution in sulfuric acid and subsequent working up. Slow distillation of the compound at a water-jet vacuum followed by chromatographic purification on alumina yield the pure $\Delta^{5(10)}$-17-oxo-19-norandrostene which is used as starting material for the preparation of the highly active $\Delta^{5(10)}$-17β-hydroxy-19-norandrostenes and their esters which are optionally substituted in 17α-position by a saturated or unsaturated hydrocarbon radical.

*Example 9*

10.0 grams of previously dried lead tetra-acetate, 3.5 grams of calcium carbonate and 500 mg. of cyclohexane are heated at 80° C. for 15 minutes with stirring, cooled, treated with 1.67 grams of iodine and 2.0 grams of 4β-hydroxy-5α-chloro-17-oxo-androstane and boiled under reflux with stirring and irradiation with a 500 watt lamp until the solution loses its color (about 1 hour). The cooled reaction mixture is filtered through Celite, the residue washed with cyclohexane, the combined filtrates washed with sodium thiosulfate solution of 10% strength and with water, dried and evaporated. There are obtained 2.2 grams of an amorphous crude product from which by chromatography on neutral alumina (activity II) 1.25 grams of 4β,19-oxido-5α-chloro-17-oxo-19-acetoxy-androstane are obtained. After recrystallization from a mixture of methylene chloride, ether and petroleum ether the compound melts at 183–184° C. and displays in the infrared spectrum inter alia bands at 5.74μ, 5.77μ, 8.10μ, 9.60μ, 9.80μ, 9.94μ and 11.40μ. From the following chromatogram fractions (benzene-ethyl acetate mixtures) there are obtained 510 mg. of the crystalline 4β,19-oxido-5α-chloro-17-oxo-19-hydroxy-androstane (M.P. 174–176° C. with decomposition). The compound displays in the infrared spectrum inter alia absorption bands at 2.75μ, 2.78μ, 8.90μ, 9.80μ, 10.03μ, 10.55μ and 11.37μ.

The 4β-hydroxy-5α-chloro-17-oxo-androstane used as starting material is obtained by hydrolyzing $\Delta^4$-17-propionyloxy-androstene and subsequent oxidation to the easily accessible $\Delta^4$-17-oxo-androstene as follows:

5.0 grams of $\Delta^4$-17-oxo-androstane are dissolved in 250 ml. of ether, treated, while being stirred vigorously, with 300 ml. of water, 6.0 grams of calcium hypochlorite and 4.2 ml. of glacial acetic acid, and the whole stirred vigorously for 25 minutes at 25° C. The reaction mixture is diluted with ether, the aqueous layer separated, extracted with ether, the ethereal solutions washed with potassium iodide and sodium thiosulfate solution of 5% strength and with ice-cold sodium bicarbonate solution of 1% strength and with water, dried and evaporated at a water-jet vacuum. By recrystallization of the resulting crude product (5.7 grams) from a mixture of ether and petroleum ether the pure 4β-hydroxy-5α-chloro-17-oxo-androstane melting at 176–177° C. is obtained.

*Example 10*

2.0 grams of crude 4β,19-oxido-5α-chloro-17-oxo-19-acetoxy-androstane are dissolved in 390 ml. of acetic acid of 96% strength, treated with stirring with 94 grams of zinc powder added in portions and boiled under reflux for 45 minutes. The reaction mixture is filtered off from inorganic constituents, the residue washed with methylene chloride, the combined filtrates evaporated at a water-jet vacuum, the resulting residue taken up in a mixture of ether and methylene chloride (1:1), the solution washed with water, then dried and evaporated in vacuo. The so-obtained crude product is dissolved in a mixture of petroleum ether and benzene (4:1) and chromatographed on neutral alumina. With a mixture of petroleum ether and benzene (1:1) 912 mg. of $\Delta^4$-17,19-dioxo-androstene are eluted which, after recrystallization from a mixture of ether and petroleum ether, melts at 75–77° C. and displays in the infrared spectrum bands inter alia at 3.70$\mu$, 5.78$\mu$, 5.85$\mu$, 9.50$\mu$ and 9.90$\mu$.

*Example 11*

Working under the same conditions as described in Example 1, from 1.5 gram of 4$\beta$-hydroxy-5$\alpha$-bromo - 20$\beta$-acetoxy-pregnane, there are obtained 820 mg. of 4$\beta$,19-oxido-5$\alpha$-bromo-19,20$\beta$-diacetoxy-pregnane which is reduced in 25 ml. of glacial acetic acid with 4 grams of zinc powder for 20 minutes at 50° C. without previous purification. The resulting crude $\Delta^4$-19-hydroxy-20$\beta$-acetoxy-pregnene is converted in a manner known per se by drastic oxidation with chromium (VI) oxide in glacial acetic acid, followed by basic hydrolysis and further oxidation, into 19-nor-progesterone melting at 143–145° C.

The 4$\beta$-hydroxy-5$\alpha$-bromo-20$\beta$-acetoxy-pregnane used as starting material is prepared from $\Delta^4$-3-oxo-20$\beta$-acetoxy-pregnene by reaction with ethylenedithioglycol, desulfurizing the resulting 3-thioketal with sodium in liquid ammonia, after acetylation, and additively combining hypobromous acid with the $\Delta^4$-double bond by reaction with N-bromosuccinimide.

*Example 12*

25.1 grams of 3-oxo-4,5-oxido-17$\beta$-hydroxy-androstane are dissolved in 160 cc. of propionic acid and after the addition of 16 cc. of concentrated sulfuric acid the reaction mixture is allowed to stand for 17 hours at room temperature. It is then poured into 2.5 liters of water, extracted with benzene, the extracts washed neutral with dilute sodium bicarbonate solution, dried and evaporated at a water-jet vacuum. The residue (23.95 grams) is crystallized from methylene chloride+methanol to yield 13.83 grams of 4-hydroxy-testosterone-propionate melting at 182–184° C.; optical rotation $[\alpha]_D = +76.8°$ (in chloroform); ultraviolet maximum at 278 m$\mu$ ($\epsilon$=12,850); infrared bands inter alia at 2.86, 5.77, 5.98, 6.07, 8.37, 8.55, 9.25, 7.66, 9.83 and 11.46$\mu$.

5.0 grams of 4-hydroxy - testosterone-propionate are acetylated in 30 cc. of pyridine with 30 cc. of acetic anhydride overnight at room temperature. The reaction mixture is evaporated at a water-jet vacuum and the residue crystallized from ether+pentane to yield 5.20 grams of 4-acetoxy-testosterone-propionate melting at 123–124° C.; optical rotation $[\alpha]_D = +94.4°$ (in chloroform); ultraviolet maximum at 246 m$\mu$ ($\epsilon$=15,400); infrared bands inter alia at 5.66, 5.77, 5.91, 6.12, 8.32, 8.75, 8.99, 9.25, 9.41, 9.62 and 9.83$\mu$.

5.28 grams of 4-acetoxy-testosterone-propionate are dissolved in 150 cc. of ether and the solution allowed to stand overnight at room temperature after the addition of 15 cc. of ethylenedithioglycol and 15 cc. of borontrifluoride etherate. The reaction mixture is washed with ice-cold 2 N-sodium hydroxide solution and with water, the ethereal solution dried and evaporated. There are obtained 6.34 grams of crystalline crude product from which there are obtained by crystallization from ethylene chloride+ether+pentane 5.94 grams of pure $\Delta^4$-3,3-ethylenedithio-4-acetoxy-17$\beta$-propionyloxy-androstene melting at 157–158° C.; optical rotation $[\alpha]_D = +115°$ (in chloroform); infrared bands inter alia at 5.64, 5.76, 8.21, 8.37, 8.76, 9.24, 9.57, 9.83 and 11.53$\mu$.

5.16 grams of the above thioketal are boiled under reflux for 3 hours in 520 cc. of methanol with the addition of 10 grams of potassium carbonate in 50 cc. of water. The reaction mixture is cooled, evaporated at a water-jet vacuum until the product precipitates strongly, and then extracted with methylene chloride. The extracts washed with water are dried and evaporated. Crude 3,3-ethylene-dithio-4-oxo-17$\beta$-hydroxy-5$\alpha$-androstane (4.69 grams) is esterified in 25 cc. of pyridine and 25 cc. of propionic anhydride for 24 hours at room temperature. The reaction mixture is then poured into water and after one hour the crude product is filtered off with suction. The resulting 3,3-ethylene-dithio-4-oxo-17$\beta$-propionyloxy - 5$\alpha$ - androstane melts at 212–214° C.; optical rotation $$[\alpha]_D = -56°$$

(in chloroform); infrared bands inter alia at 5.77, 5.82, 8.40, 9.25, 9.35, 9.72 and 11.42$\mu$.

4.5 grams of crude 3,3-ethylenedithio-4-oxo-17$\beta$-propionyloxy-$\alpha$-androstane are dissolved in 250 cc. of alcohol and, after the addition of about 40 grams of Raney nickel moistened with alcohol, the solution is stirred for 45 minutes at 60° C. The nickel is filtered off with suction, washed with alcohol and the filtrate evaporated at a water-jet vacuum. The residue is purified by being taken up in methylene chloride and the solution washed with water. From the evaporation residue of the methylene chloride solution (2.97 grams) there are obtained by crystallization from methanol 2.60 grams of 4-oxo-17$\beta$-propionyloxy-5$\alpha$-androstane melting at 122–124° C.; optical rotation $[\alpha]_D = +4.0°$ (in chloroform); infrared bands inter alia at 5.77, 5.83, 8.39, 9.24, 9.72 and 10.66$\mu$.

By hydrolysis with potassium carbonate in methanol at 50° C. for 3 hours there are obtained from 1.05 grams of the propionate after crystallization of the crude product from methylene chloride+ether 860 mg. of 4-oxo-17$\beta$-hydroxy-5$\alpha$-androstane melting at 125–127° C.; optical rotation $[\alpha]_D = +16°$ (in chloroform); infrared bands inter alia at 2.78, 5.84, 7.62, 8.25, 8.96, 9.25, 9.50, 9.75 and 10.66$\mu$.

*Example 13*

2.65 grams of 4-acetoxy-testosterone acetate in 75 cc. of ether are allowed to stand overnight at room temperature after the addition of 7.5 cc. of ethylenedithioglycol and 7.5 cc. of boron trifluoride etherate. The reaction mixture is then worked up as described in Example 12 to yield 3.21 grams of crystalline $\Delta^4$-3,3-ethylenedithio-4,17$\beta$-diacetoxy-androstene which, after being recrystallized from methylene chloride+ether, melts at 209–211° C.; optical rotation $[\alpha]_D = +31°$ (in chloroform); infrared bands inter alia at 5.73, 5.76, 8.13, 8.97, 9.64, 9.80, 10.98, 11.55 and 11.76$\mu$.

By hydrolysis with potassium carbonate, as described in Example 12, there is obtained from the above compound 3,3-ethylenedithio-4-oxo-17$\beta$-hydroxy-5$\alpha$ - androstane which, after being desulfurized with Raney nickel, yields 4-oxo-17$\beta$-hydroxy-5$\alpha$-androstane melting at 125–127° C.

*Example 14*

3.5 grams of 4-hydroxy-testosterone propionate are dissolved in 350 cc. of glacial acetic acid. To the solution heated at 55° C. there are added 10.5 cc. of ethylenedithioglycol and 10.5 cc. of boron trifluoride etherate, and the whole is stirred for 2¼ hours at 55° C.

The reaction mixture is then poured into 2.4 liters of water, extracted with methylene chloride and the extracts washed neutral with dilute sodium bicarbonate solution. From the residue of the methylene chloride extracts (4.99 grams) there are obtained by crystallization from methylene chloride+methanol 3.7 grams of pure 3,3-ethylenedithio-4-oxo-17$\beta$-propionyloxy - 5$\beta$ - androstane melting at 162–164° C.; optical rotation $[\alpha]_D = +94°$ (in chloroform); infrared bands inter alia at 5.79, 5.82, 7.24, 7.40, 8.38, 9.25, 9.36, 9.79, 11.58 and 12.05$\mu$.

3.34 grams of the thioketal are stirred in 350 cc. of alcohol with 25 grams of Raney nickel moistened with alcohol for 1½ hours at 60° C. The nicked is then filtered off, washed with 1000 cc. of methylene chloride and the filtrate extracted with saturated sodium chloride solution. From the methylene chloride+alcohol solution there are obtained by evaporation at a water-jet vacuum 2.72 grams of crude product from which by crystallization from pentane there are obtained 2.0 grams of pure 4-oxo-17β-propionyloxy-5β-androstane melting at 118–119° C.; optical rotation [α]$_D$=+21° (in chloroform); infrared bands inter alia at 5.76, 5.85, 8.36, 9.25, 9.56, 9.78, 11.52 and 12.02μ.

2.10 grams of the above compound are heated in 100 cc. of methanol after the addition of a solution of 1.0 gram of sodium hydroxide in 10 cc. of water for 4 hours at 60° C. under nitrogen. After cooling, the reaction mixture is neutralized with 2.0 cc. of glacial acetic acid and the mixture evaporated at a water-jet vacuum. The residue is taken up in methylene chloride, the solution washed and dried and evaporated. By recrystallization of the residue (2.00 grams) from methylene chloride+ether there are obtained 1.76 grams of pure 4-oxo-17β-hydroxy-5β-androstane melting at 117–119° C.

*Example 15*

2.06 grams of 4-oxo-17β-propionyloxy-5α-androstane are stirred in 100 cc. of glacial acetic acid after the addition of 600 mg. of platinum oxide under hydrogen until the absorption of gas ceases. The solution is then filtered and the filtrate evaporated at a water-jet vacuum. The residue is crystallized from methylene chloride+ether+pentane to yield 1.78 grams of 4β-hydroxy-17β-propionyloxy-5α-androstane melting at 163–165° C.

56 mg. of the above compound are acetylated in 2 cc. of pyridine and 3 cc. of acetic anhydride for 4 hours at 80° C. By crystallization of the evaporation residue of the reaction solution from methanol+water there is obtained 4β-acetoxy-17β-propionyloxy-5α - androstane melting at 104–106° C.; optical rotation [α]$_D$=+9 (in chloroform); infrared bands inter alia at 5.77, 7.12, 8.38, 8.65, 9.78, 10.25 and 10.54μ.

*Example 16*

A solution of 1.20 grams of 4-hydroxy-17α-methyltestosterone in 36 cc. of benzene and 1.2 cc. of pyridine is cooled in ice 6.0 cc. of trifluoracetic anhydride are added dropwise with stirring and the exclusion of water and the reaction mixture then allowed to stand for 16 hours at 5–10° C. It is then poured, while stirring vigorously, into a mixture of 100 cc. of saturated sodium bicarbonate solution and 100 cc. of water and extracted with benzene. The extracts washed with sodium bicarbonate solution and water are evaporated at a water-jet vacuum. The residue (1.57 grams) is crystallized from ether+pentane to yield 1.30 grams of Δ$^4$-3-oxo-4-hydroxy-17β-trifluoracetoxy-17α-methyl-androstene melting at 156–158°; optical rotation [α]$_D$=+56° (in chloroform); ultraviolet maximum at 278 mμ

(ε=12,600)

infrared bands inter alia at 2.91, 5.61, 5.98, 6.08, 8.25, 8.60, 8.76, 9.29, 10.30, 11.28 and 11.85μ.

In an analogous manned to that described in Example 14 there is obtained from the above compound 3,3-ethylenedithio-4-oxo-17β-trifluoracetoxy-17α-methyl-5β - androstane which, after treatment with Raney nickel and hydrolysis with methanolic sodium hydroxide solution, yields 4-oxo-17β-hydroxy-17α-methyl-5α-androstane.

What is claimed is:

1. Process for the manufacture of 4β,19-oxido-steroids, wherein 19-unsubstituted 4β-hydroxy-steroids are treated with a compound generating monovalent positive iodine selected from the group consisting of N-iodo-lower aliphatic carboxylic acid amide, N-iodo-lower aliphatic carboxylic acid imide, lower alkylhypoiodite and lower aliphatic acylhypoiodite.

2. Process as claimed in claim 1, wherein the reaction is carried out in the presence of iodine.

3. Process as claimed in claim 1, wherein a lead tetraacylate and iodine is used as compound generating monovalent positive iodine.

4. Process as claimed in claim 3, wherein lead tetraacetate and iodine are used.

5. Process as claimed in claim 1, wherein the reaction is accelerated by irradiating the mixture with light selected from the group consisting of visible and ultra-violet light.

6. Process as claimed in claim 1, wherein androstanes of the formula

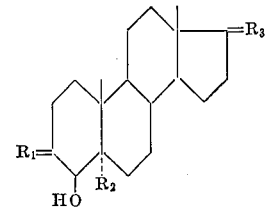

are used as starting material, in which R$_1$ represents a member selected from the group consisting of two hydrogen atoms, a hydrogen atom together with an esterified hydroxyl group and a ketalized oxo group, R$_2$ stands for a member selected from the group consisting of a hydrogen atom, a halogen atom and an esterified hydroxyl group, and R$_3$ is a member selected from the group consisting of an oxo group, a hydrogen atom together with a β-positioned esterified hydroxyl group, and a lower aliphatic hydrocarbon radical together with a β-positioned esterified hydroxyl group.

7. A compound of the formula

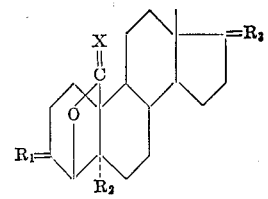

in which R$_1$ represents a member selected from the group consisting of two hydrogen atoms, a hydrogen atom together with a hydroxyl group, a hydrogen atom together with an esterified hydroxyl group, an oxo group and a lower alkylenedioxy group, R$_2$ stands for a member selected from the group consisting of a hydrogen atom, a halogen atom, a hydroxyl group, and an esterified hydroxyl group, R$_3$ is a member selected from the group consisting of an oxo group, a lower alkylenedioxy group, a hydrogen atom together with a β-positioned hydroxyl group, a hydrogen atom together with a β-positioned esterified hydroxyl group, a lower aliphatic hydrocarbon radical together with a β-positioned hydroxyl group, a lower aliphatic hydrocarbon radical together with a β-positioned esterified hydroxyl group, and X represents a member selected from the group consisting of two hydrogen atoms, a hydrogen atom together with a hydroxyl group, a hydrogen atom together with an esterified hydroxyl group and an oxo group.

8. A compound of the formula

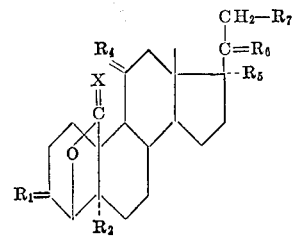

in which R$_1$ represents a member selected from the group consisting of two hydrogen atoms, a hydrogen atom together with a hydroxyl group, a hydrogen atom together with an esterified hydroxyl group, an oxo group and a lower alkylenedioxy group, R$_2$ stands for a member selected from the group consisting of a hydrogen atom, a halogen atom, a hydroxyl group, and an esterified hydroxyl group, each of X and R$_4$ represent a member selected from the group consisting of two hydrogen atoms, a hydrogen atom together with a hydroxyl group, a hydrogen atom together with an esterified hydroxyl group and an oxo group, each of $R_5$ and $R_7$ represents a member selected from the group consisting of a hydrogen atom, a hydroxyl group, and an esterified hydroxyl group and $R_6$ stands for a member selected from the group consisting of an oxo group, a lower alkylenedioxy group, a hydrogen atom together with a hydroxyl group and a hydrogen atom together with an esterified hydroxyl group.

9. 3β,17β - dihydroxy - 4β,19-oxido-5α-halogen-androstanes.

10. 4β,19-oxido-17β-hydroxy-androstane.

11. 3β,17β,19 - trihydroxy - 4β,19-oxido-5α-halogen-androstanes.

12. 17β,19 - dihydroxy - 4β,19-oxido-5α-halogen-androstanes.

13. 4β,19 - oxido - 5α - halogen - 17-oxo-19-hydroxy-androstanes.

14. 4β,19-oxido-17β,19-dihydroxy-androstane.

15. The 4,19 - lactone of the 4β,17β-dihydroxy-androstane-19-acid.

16. The 4,19-lactones of 5α-halogen-4β,17β-dihydroxy-androstane-19-acids.

17. Δ⁴-17β-hydroxy-19-oxo-androstene.

18. Δ⁴-17,19-dioxo-androstene.

19. Δ⁴-17β-hydroxy-androstene-19-acid.

20. 4β,17β-dihydroxy-5α-androstane.

21. 4β,17β-dihydroxy-17α-methyl-5α-androstane.

22. 4β,17β-dihydroxy-17α-ethyl-5α-androstane.

References Cited by the Examiner

UNITED STATES PATENTS 2,900,399  8/1959  Julian et al. _____ 260—397.4
3,098,852  7/1963  Johns _____ 260—239.55

LEWIS GOTTS, *Primary Examiner.*

HENRY A. FRENCH, *Assistant Examiner.*